US008750140B2

(12) United States Patent
Bi et al.

(10) Patent No.: US 8,750,140 B2
(45) Date of Patent: Jun. 10, 2014

(54) SUPPORT OF HOME NETWORK BASE STATION LOCAL INTERNET PROTOCOL ACCESS

(75) Inventors: Hao Bi, Lake Zurich, IL (US); Howard Benn, Swindon (GB); Scott Droste, Crystal Lake, IL (US); Jian Wu, Reading (GB)

(73) Assignee: Motorola Mobility LLC, Chicago, IL (US)

( * ) Notice: Subject to any disclaimer, the term of this patent is extended or adjusted under 35 U.S.C. 154(b) by 618 days.

(21) Appl. No.: 12/435,559

(22) Filed: May 5, 2009

(65) Prior Publication Data

US 2010/0284299 A1 Nov. 11, 2010

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl.
USPC ......... 370/252; 370/328; 370/395.5; 455/561

(58) Field of Classification Search
USPC ............... 370/252, 328, 331, 395.5; 455/561, 455/435.1
See application file for complete search history.

(56) References Cited

U.S. PATENT DOCUMENTS

| | | | | |
|---|---|---|---|---|
| 7,099,687 B1* | 8/2006 | Makela et al. | ............ | 455/552.1 |
| 2003/0100300 A1* | 5/2003 | Yang et al. | ................... | 455/426 |
| 2007/0259673 A1* | 11/2007 | Willars et al. | ................ | 455/453 |
| 2008/0305799 A1* | 12/2008 | Zuniga et al. | ................ | 455/437 |
| 2008/0316971 A1* | 12/2008 | Shaheen | ...................... | 370/331 |
| 2008/0316972 A1* | 12/2008 | Shaheen | ...................... | 370/331 |
| 2009/0016274 A1* | 1/2009 | Nylander et al. | ............ | 370/328 |
| 2009/0052384 A1* | 2/2009 | Zisimopoulous et al. | ..... | 370/329 |
| 2009/0070694 A1* | 3/2009 | Ore et al. | ..................... | 715/764 |
| 2009/0094680 A1* | 4/2009 | Gupta et al. | ..................... | 726/3 |
| 2009/0109924 A1* | 4/2009 | Sato | .............................. | 370/331 |
| 2009/0156208 A1* | 6/2009 | Vesterinen et al. | ........ | 455/435.1 |
| 2009/0232022 A1* | 9/2009 | Savolainen et al. | .......... | 370/254 |
| 2012/0039213 A1* | 2/2012 | Cheng et al. | .................. | 370/254 |

FOREIGN PATENT DOCUMENTS

WO WO 2009041780 A2 * 4/2009

OTHER PUBLICATIONS

Hao Bi; U.S. Appl. No. 12/407,912, filed Mar. 20, 2009.
Hao Bi et al.; U.S. Appl. No. 12/408,959, filed Mar. 23, 2009.
3GPP TS 22.220 V9.0.0; 3rd Generation Partnership Project; Technical Specification Group Services and System Aspects; Service Requirements for Home NodeBs and Home eNodeBs; Release 9; Mar. 2009.

(Continued)

Primary Examiner — Benjamin H Elliott, IV (57) ABSTRACT

A method, a mobile system, and a home network base station are disclosed. A mobility management entity 502 may receive a notification of a connection attempt by a mobile system 104. The mobility management entity 502 may generate a network access message element 650 having a bearer protocol parameter. The mobility management entity 502 may send the network access message element 650 to the mobile system 104 via a home network base station 110. The mobile system 104 may use the bearer protocol parameter to establish packet data network connectivity with a home network 108 associated with the home network base station 110. The mobile system 104 may determine a traffic bearer for a data traffic set based on the bearer protocol parameter.

20 Claims, 10 Drawing Sheets

(56) References Cited

OTHER PUBLICATIONS

3GPP TS 23.401 V9.0.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 9; Mar. 2009.

3GPP; Meeting #70; Access Control for In-Bound Mobility to HeNBs; Jan. 12-16, 2009; Scottsdale, Phoenix, Arizona.

3GPP; Meeting #65; Support of Paging Optimisation for CSG Cells; Feb. 9-13, 2009; Athens, Greece.

3GPP; Meeting #71; Support for Hybrid and Open Access Mode H(e)NBs; Feb. 16-20, 2009; Budapest, Hungary.

Motorola; 3GPP TSG SA WG2 Meeting #73; Architecture for Local IP Access; May 11-15, 2009; Tallinn, Estonia; Release 9; TD S2-093516.

Motorola; 3GPP TSG SA WG2 Meeting #74; Discussions on Local IP Access; Jul. 6-10, 2009; Sophia Antipolis, France; Release 10; TD S2-094427.

Motorola; 3GPP TSG SA WG2 Meeting #74; Manual CSG Selection Across PLMN; Jul. 6-10, 2009; Sophia Antipolis, France; Release 9; TD S2-094428.

Motorola; 3GPP TSG SA WG2 Meeting #74; PLMN Change in Manual CSG Selection; Jul. 6-10, 2009; Sophia Antipolis, France; Release 9; Change Request; S2-094429.

Motorola; 3GPP TSG SA WG2 Meeting #75; Architectural Principle for UE to Support Local IP Access and Selected IP Traffic Offload; Aug. 31-Sep. 4, 2009; Kyoto, Japan; TD S2-095219.

PCT Search Report Issued in Connection With Related PCT Application No. PCT/US2010/026758.

* cited by examiner

SUPPORT OF HOME NETWORK BASE STATION LOCAL INTERNET PROTOCOL ACCESS

FIELD OF THE INVENTION

The present invention relates to a method and system for accessing a home network. The present invention further relates to granting local internet protocol access to a mobile system.

INTRODUCTION

A mobile system may access a universal terrestrial radio access network (UTRAN) and an evolved UTRAN (E-UTRAN) cellular network through base stations installed at domestic homes or belonging to business and commercial enterprises, called Home NodeB (HNB) in UTRAN and Home eNodeB (HeNB) in E-UTRAN. The HNB or the HeNB may be part of an at least partially wireless local area network (LAN) referred to as a home network. The HNB or HeNB may provide access to both a core mobile network and the home network.

SUMMARY OF THE INVENTION

A method, a mobile system, and a home network base station are disclosed. A mobility management entity may receive a notification of a connection attempt by a mobile system. The mobility management entity may generate a network access message element having a bearer protocol parameter. The mobility management entity may send the network access message element to the mobile system via the home network base station. The mobile system may use the bearer protocol parameter to establish packet data network connectivity with a home network associated with the home network base station. The mobile system 104 may determine a traffic bearer for a data traffic set based on the bearer protocol parameter.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an apparatus, and an electronic device, and other embodiments that relate to the basic concepts of the invention. The electronic device may be any manner of computer, mobile device, or wireless communication device.

A method, a mobile system, and a home network base station are disclosed. A mobility management entity may receive a notification of a connection attempt by a mobile system. The mobility management entity may generate a network access message element having a bearer protocol parameter. The mobility management entity may send the network access message element to the mobile system via the home network base station. The mobile system may use the bearer protocol parameter to establish packet data network (PDN) connectivity with a home network associated with the home network base station. The mobile system may determine a traffic bearer for a data traffic set based on the bearer protocol parameter.

Figure 1:
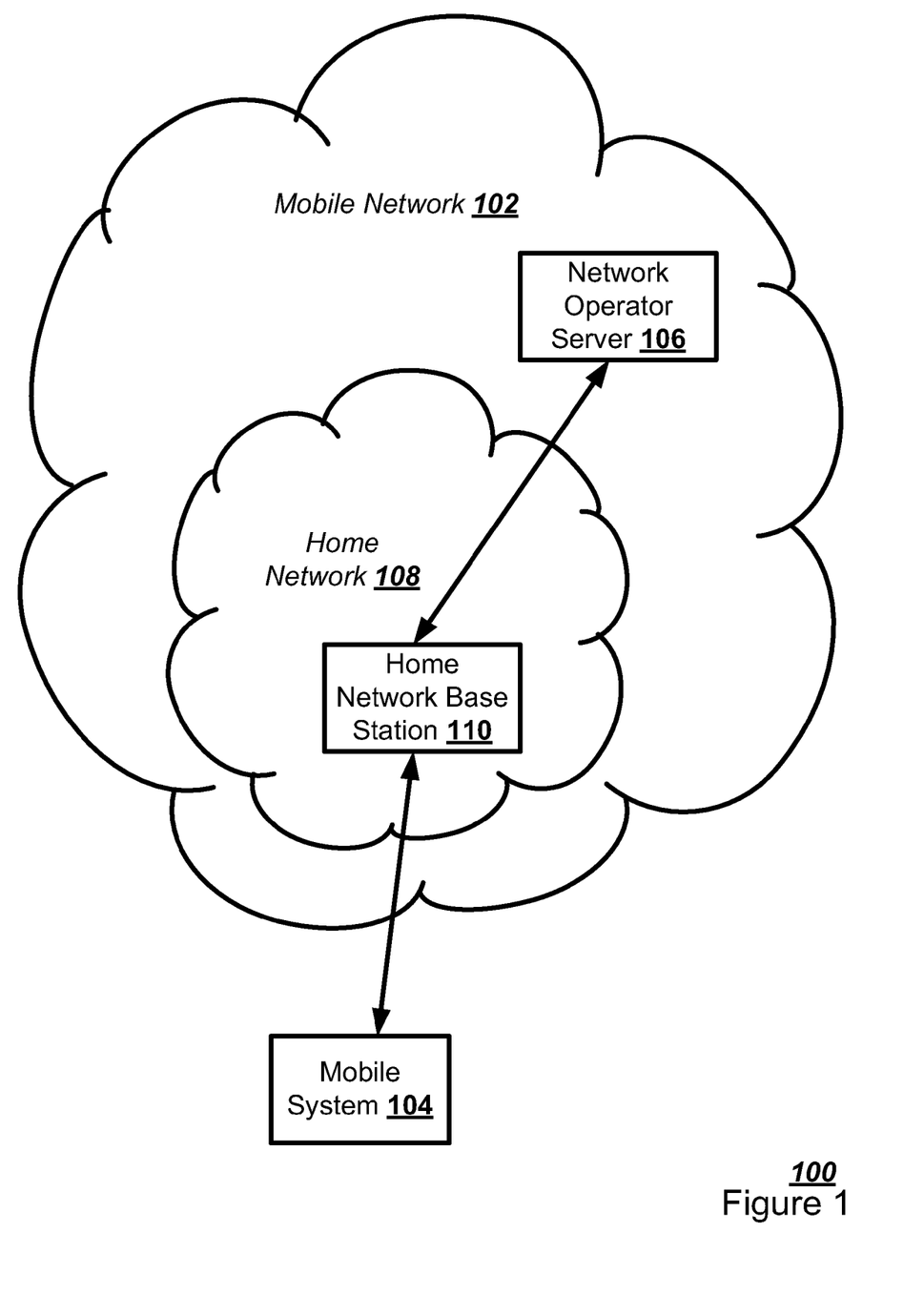
FIG. 1 illustrates in a block diagram one embodiment of a communication system.

FIG. 1 illustrates one embodiment of a communication system 100. The communication system 100 may include a core mobile network 102 that may be accessed by at least one mobile device 104, such as an electronic device, mobile system, or user equipment (UE). Various communication devices may exchange data or information through the core mobile network 102. The core mobile network 102 may be a WiMAX network, a universal terrestrial radio access network (UTRAN) cellular network, an evolved UTRAN (E-UTRAN) cellular network, or other type of telecommunication network. A server or a series of servers controlled by a network operator, referred to herein as a network operator server 106, may administer the network. The network operator server 106 may maintain a set of data to facilitate access of the core mobile network 102 by the mobile system 104.

A home, office, or other localized setting may maintain a home network 108. The home network 108 may be an at least partially wireless local area network (LAN) connected to the core mobile network 102. The home network 108 may be connected to the core mobile network 102 via one or more home network base stations 110, such as a home NodeB (HNB) or a home evolved NodeB (HeNB). The mobile system 104 may use the home network base station 110 to access either the mobile network 102 or the home network 108 through the home network base station 110. The home network base station 110 may allow a mobile system 104 access, if the mobile system 104 is a part of a closed subscriber group (CSG) associated with the home network 108. The mobile system 104 may store a list of CSG identifiers (ID), or a CSG ID list, detailing which home network base station 110 the mobile system 104 may access. The network operator server 106 may store the CSG ID list to administer access to the various home networks.

If the home network base station 110 is a closed mode base station, a mobile system 104 may connect with the home network base station 110 if the mobile system 104 is a member of the associated CSG. If the home network base station 110 is a hybrid base station or open base station, a mobile system 104 may use the home network base station 110 to connect with the mobile network 102 even if the mobile system 104 is not a member of the associated CSG.

Figure 2:
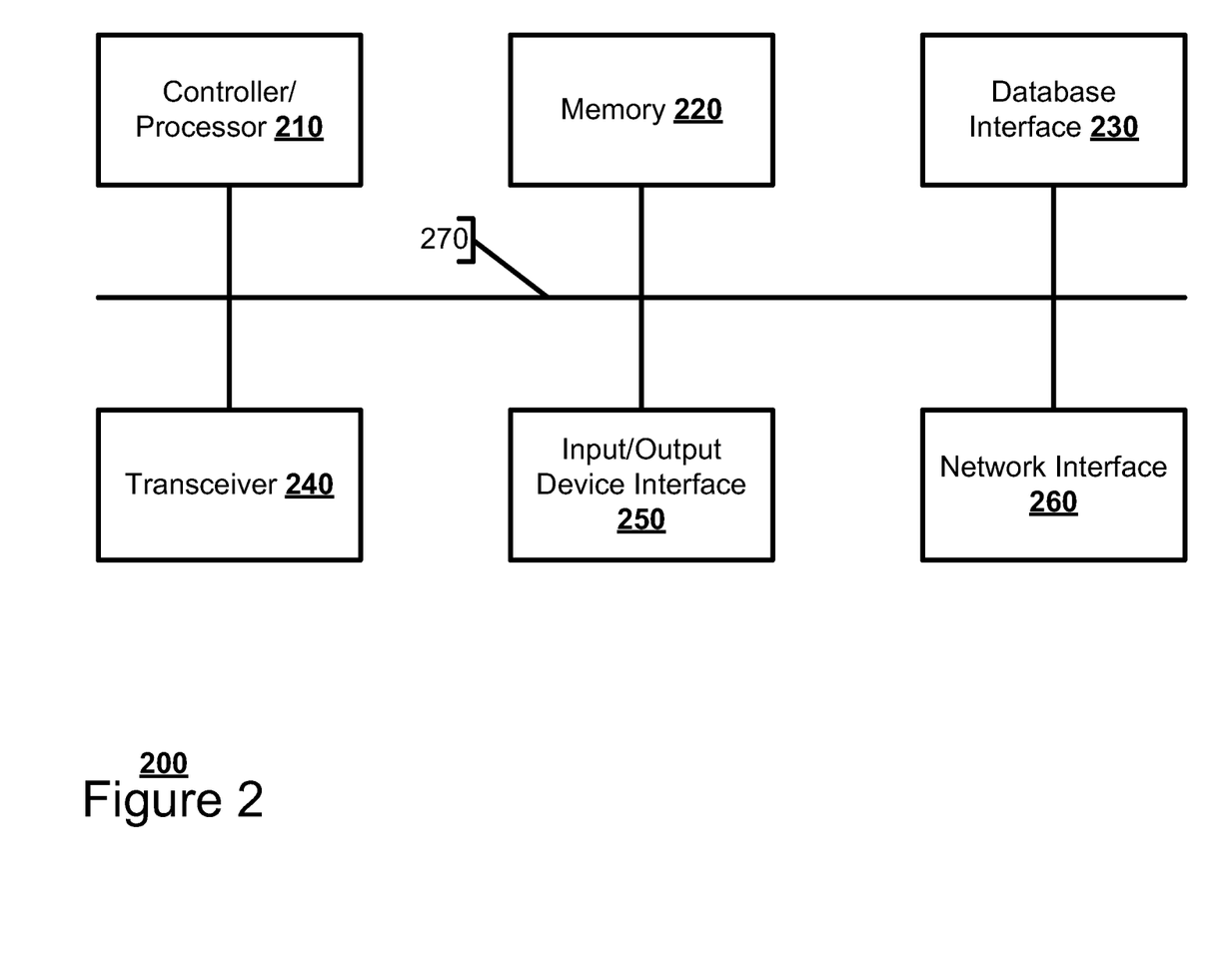
FIG. 2 illustrates a possible configuration of a computing system to act as a base transceiver station.

FIG. 2 illustrates a possible configuration of a computing system 200 to act as a network operator server 106 or a home network base station 110. The computing system 200 may include a controller/processor 210, a memory 220, a database interface 230, a transceiver 240, input/output (I/O) device interface 250, and a network interface 260, connected through bus 270. The network server 200 may implement any operating system. Client and server software may be written in any programming language, such as C, C++, Java or Visual Basic, for example. The server software may run on an application framework, such as, for example, a Java® server or .NET® framework The controller/processor 210 may be any programmed processor known to one of skill in the art. However, the decision support method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein may be used to implement the decision support system functions of this invention.

The memory 220 may include volatile and nonvolatile data storage, including one or more electrical, magnetic or optical memories such as a random access memory (RAM), cache, hard drive, or other memory device. The memory may have a cache to speed access to specific data. The memory 220 may also be connected to a compact disc-read only memory (CD-ROM, digital video disc-read only memory (DVD-ROM), DVD read write input, tape drive, or other removable memory device that allows media content to be directly uploaded into the system.

Data may be stored in the memory or in a separate database. The database interface 230 may be used by the controller/processor 210 to access the database. The database may contain a subscriber information set for each mobile system that may access the mobile network 102 or a home network 108.

The transceiver 240 may create a connection with the mobile device 104. The transceiver 240 may be incorporated into the base station 200 or may be a separate device.

The I/O device interface 250 may be connected to one or more input devices that may include a keyboard, mouse, pen-operated touch screen or monitor, voice-recognition device, or any other device that accepts input. The I/O device interface 250 may also be connected to one or more output devices, such as a monitor, printer, disk drive, speakers, or any other device provided to output data. The I/O device interface 250 may receive a data task or connection criteria from a network administrator.

The network connection interface 260 may be connected to a communication device, modem, network interface card, a transceiver, or any other device capable of transmitting and receiving signals from the network. The network connection interface 260 may be used to connect a client device to a network. The network interface 260 may connect the home network base station 110 to a mobility management entity of the network operator server 106. The components of the network server 200 may be connected via an electrical bus 270, for example, or linked wirelessly.

Client software and databases may be accessed by the controller/processor 210 from memory 220, and may include, for example, database applications, word processing applications, as well as components that embody the decision support functionality of the present invention. The network server 200 may implement any operating system. Client and server software may be written in any programming language. Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Figure 3:
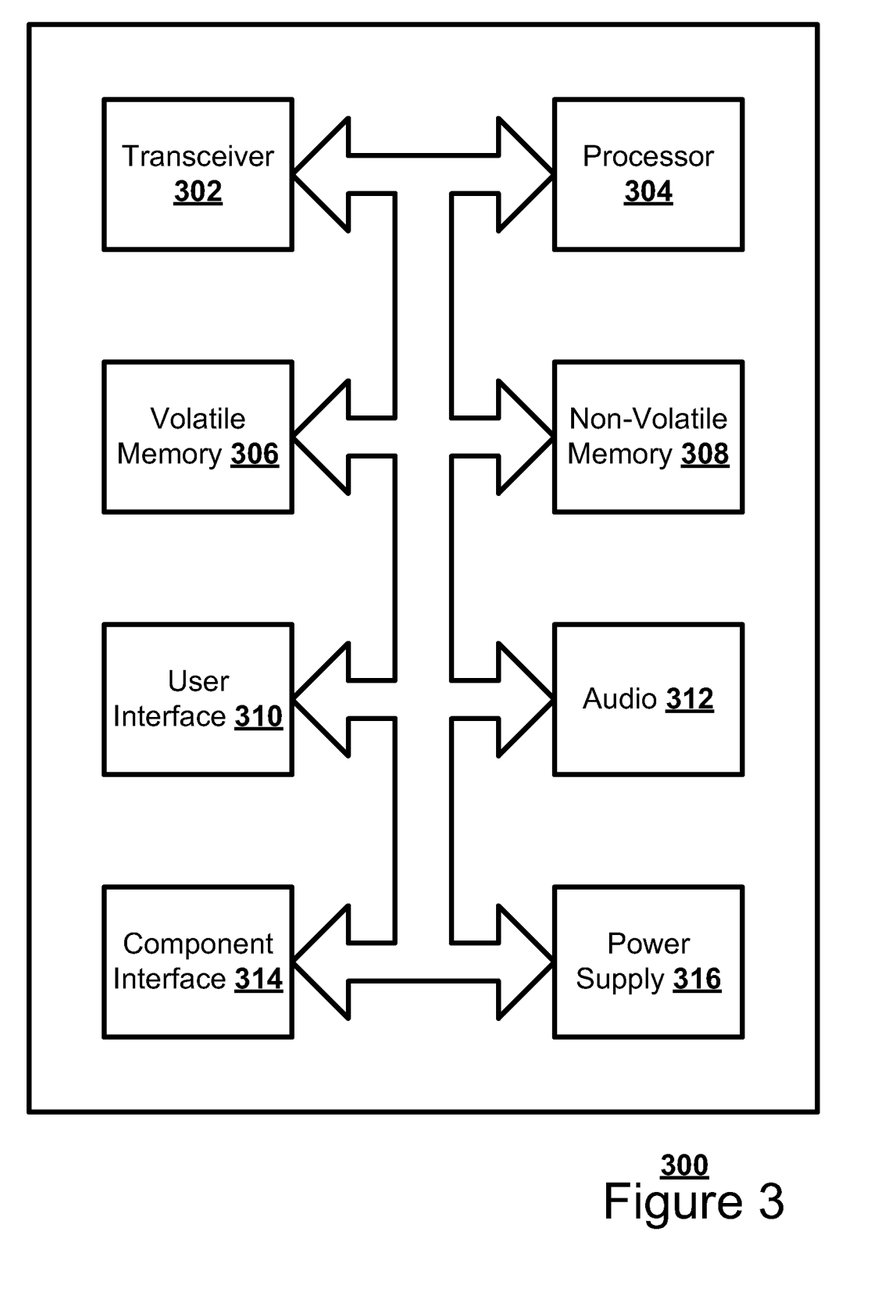
FIG. 3 illustrates in a block diagram one embodiment of a mobile system or electronic device to create a radio connection.

FIG. 3 illustrates one embodiment of a mobile device 300, capable of acting as a mobile system or electronic device. For some embodiments of the present invention, the mobile device 300 may also support one or more applications for performing various communications with a network. The mobile device 300 may be a handheld device, such as, a mobile phone, a laptop, or a personal digital assistant PDA). For some embodiments of the present invention, the user device 300 may be WiFi® capable device, which may be used to access the network mobile for data or by voice using VoIP.

The mobile device 300 may include a transceiver 302, which is capable of sending and receiving data over the mobile network 102. The mobile device 300 may include a processor 304 that executes stored programs. The mobile device 300 may also include a volatile memory 306 and a non-volatile memory 308 to act as data storage for the processor 304. The mobile device 300 may include a user input interface 310 that may comprise elements such as a keypad, display, touch screen, and the like. The mobile device 300 may also include a user output device that may comprise a display screen and an audio interface 312 that may comprise elements such as a microphone, earphone, and speaker. The mobile device 300 also may include a component interface 314 to which additional elements may be attached, for example, a universal serial bus (USB) interface. Finally, the mobile device 300 may include a power supply 316.

Figure 4:
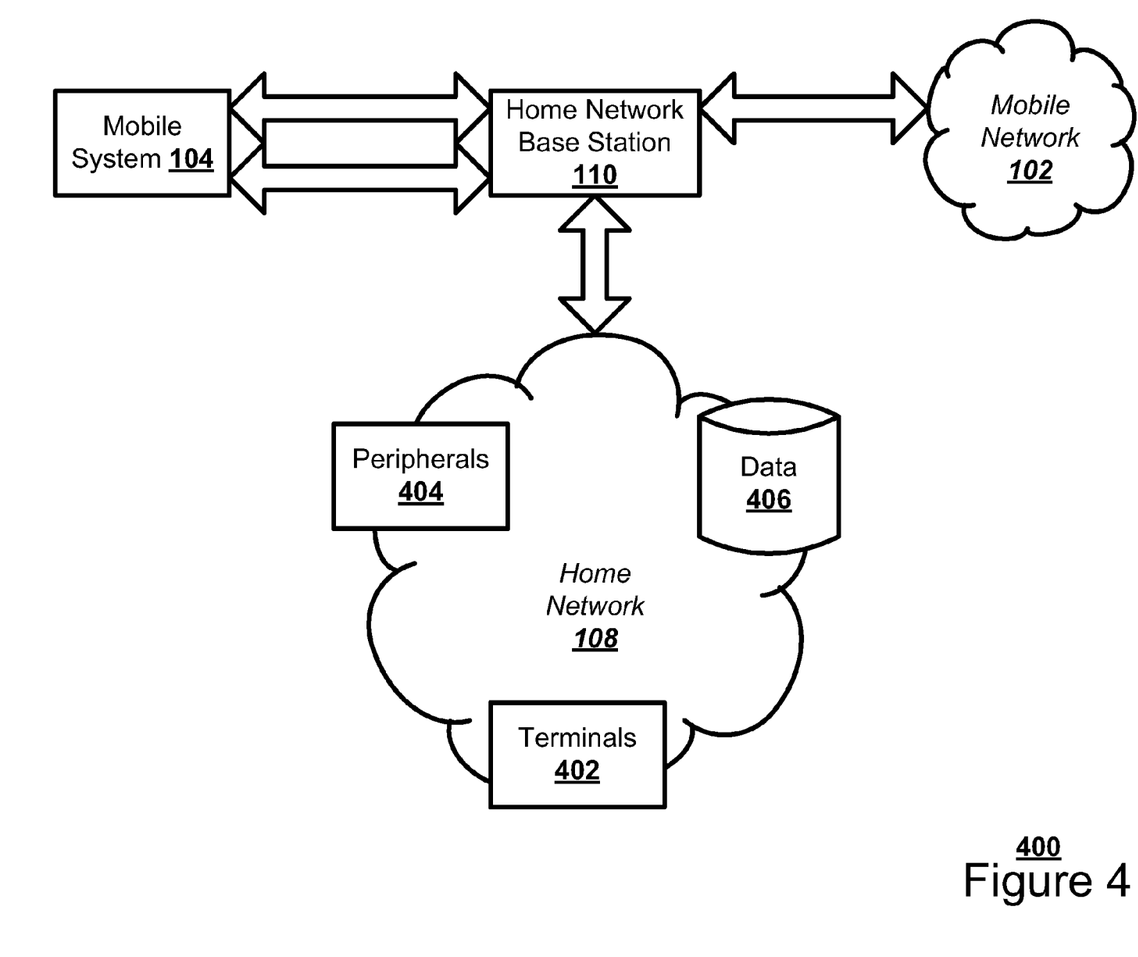
FIG. 4 illustrates, in a block diagram, one embodiment of a home network interaction.

FIG. 4 illustrates, in a block diagram, one embodiment of a home network interaction 400. A mobile system 104 may access a mobile network 102, or core mobile network 102, via the home network base station 110, if the home network base station 110 is on the CSG ID list for the mobile system 104. Additionally, the home network 108 is attached to the home network base station 110, the mobile system 104 may access the home network 108. Local internet protocol (IP) access may provide a directly connected, IP capable mobile access to other IP capable devices in the home network 108 and to the internet through the home network 108. A home network owner may have control over access to the home network 108. The home network base station 110 may provide varying degrees of access to a portion of the home network 108 based on the mobile trust level provided by the network operator server 106. For example, the home network owner may allow a guest user to use the home network 108 to access the core mobile network 102 for voice, media, or other data sets.

For example, a mobile system 104 with a low mobile trust level may be limited to sending and receiving communications to user terminals 402 on the home network 108 or limited to contact with the mobile network 102. A mobile system 104 with an intermediate mobile trust level may user peripheral devices 404 connected to the home network 108, such as printers, audio players, video displays, and other peripheral devices. A mobile system 104 with a high mobile trust level may access data 406 stored in the home network 108.

Figure 5:
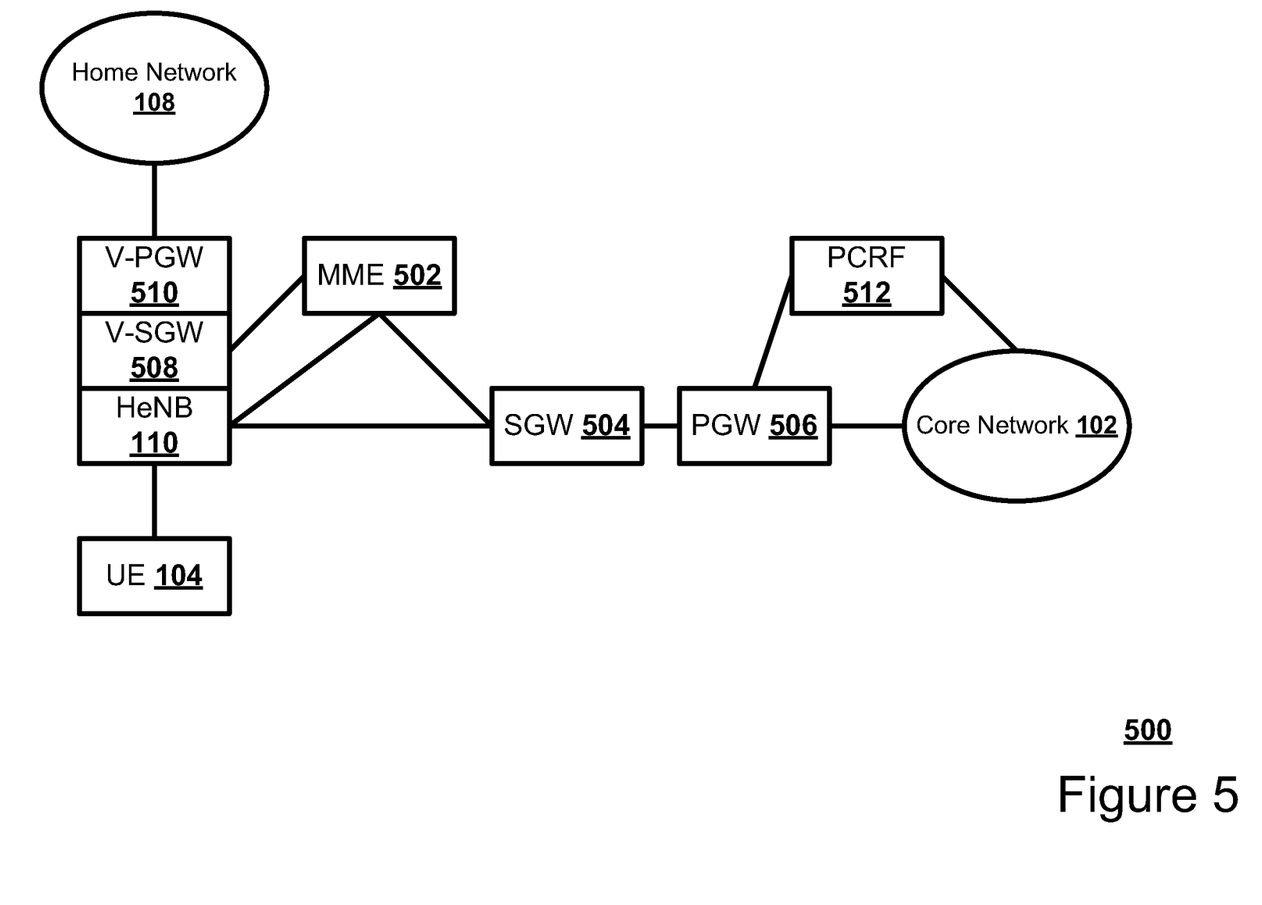
FIG. 5 illustrates, in a block diagram, one embodiment of the network architecture for a home network.

FIG. 5 illustrates, in a block diagram, one embodiment of the network architecture 500 for a home network 108. A mobility management entity 502 may use the home network base station (HeNB) 110 to control the interaction between the mobile system (UE) 104 and the home based internet protocol (IP) network 108 or the mobile operator's core IP network 102. A serving gateway (SGW) 504 may route user data packets. A PDN gateway (PGW) 506 may connect the UE 104 to an external PDN. The HeNB 110 may perform local IP access support function by modeling a virtual SGW (V-SGW) 508 and a virtual PGW (V-PGW) 510. The V-SGW 508 may provide an evolved packet system (EPS) connection management (ECM) idle mode for downlink packet buffering and an initiation of a network triggered service request procedure. The V-SGW 508 may collect uplink and downlink traffic statistics. The V-PGW 510 may allocate the UE IP address to access the home based IP network 108. The V-PGW 510 may provide dynamic host configuration protocol functions. A policy and charging rules function (PCRF) module 512 may provide network control regarding the service data flow detection, gating, quality of service (QoS), and flow based charging.

The mobile network 102 may send a network access message element, such as via a MME 502, to inform the mobile system 104 that local IP access to the home based network is available. The network access message element may instruct the mobile system 104 as to the kind of IP traffic routed through the home based IP network 108 and the kind of IP traffic to be kept in the operator's core mobile network 102. The mobile network 102 may send the network access message element using various non-access stratum messages. For example, the mobile network 102 may send a local IP access notification message to a mobile system 104, via the home network base station 110. The access notification message may contain the network access message element. The network access message element may be contained in other messages, such as an attach accept message, tracking area update accept message, activate dedicated EPS bearer context request, activate default EPS bearer context request, bearer resource allocation reject, bearer resource modification reject, deactivate EPS bearer context request, modify EPS bearer context request, PDN disconnect reject, and other access status messages.

Figure 6:
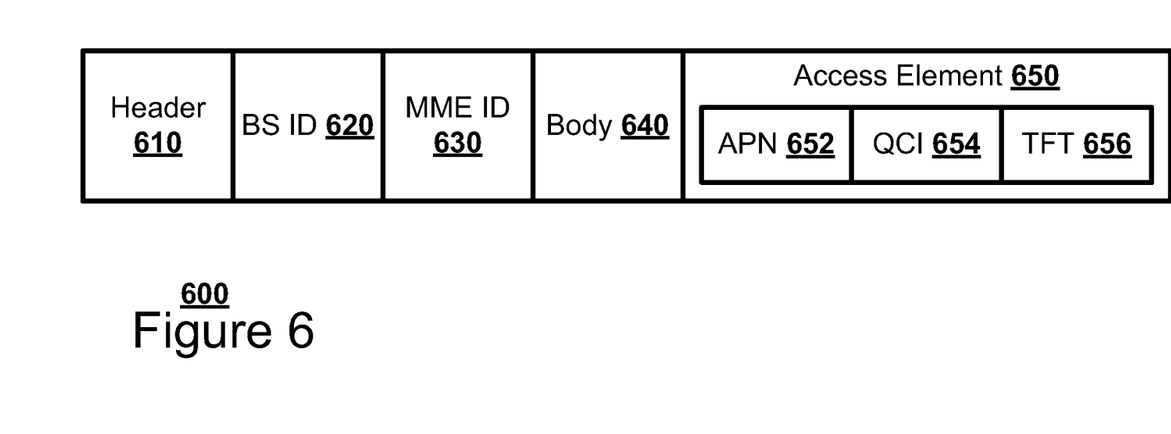
FIG. 6 illustrates, in a block diagram, one embodiment of an access status message.

FIG. 6 illustrates, in a block diagram, one embodiment of an appended message 600. The appended message 600 may have a header 610 to indicate the route and destination, a network base station identifier (BS ID) 620, a MME ID 630, and a body 640 containing message data. Additionally, the MME 502 or the home network base station 110 may append a network access message element 650 to the message 600.

The network access message element 650 may have a home network identifier 652, a traffic characteristic classifier 654, a traffic sorting rule 656, or other bearer protocol parameters indicating the packet data network an impacted data bearer is established towards and the kind of specific data traffic from a network on a data bearer.

The mobile system 104 may use an identity related to the home based IP network 652, such as an access point name (APN) 652, to determine availability of a home network 110 and initiate establishment of a new PDN connectivity towards the home network 110 through the V-PGW 510 within the home network base station 110. Once the mobile system 104 sends a PDN connectivity request to the APN associated with the home network 108, the MME 502 may communicates with the home network base station 110 and the mobile system 104 to establish the bearer between the mobile system 104 and the home network 108. As the mobile system 104 has already established data bearers towards the core mobile network 102, the mobile system 104 may have simultaneous exchange of IP traffic to both the home based network 108 and the core mobile network 102, through the respective PGWs 506.

A traffic characteristic classifier 654, such as a QoS class index (QCI) 654, may instruct the mobile system 104 as to the kind of IP traffic routed through the home network 108 and may assign a media type to a bearer option. For example, a traffic characteristic classifier 654, like the QCI 654, may instruct the mobile system 104 to use the home network 108 to route IP traffic related to web surfing, file transfer protocol (FTP), or peer to peer (P2P) file sharing, as opposed to using the core mobile network 102 to route IP traffic related to voice and real time video.

A traffic sorting rule 656, such as a traffic flow template (TFT) 656, for bearers traversing the core mobile network 102 may include a set of packet filters, defining the type of IP traffic to be carried on the associated bearer and assigning a media source to a bearer option. The packet filter may define a variety of rules to sort the IP traffic. For example, the packet filter component may specify IP traffic from particular sites with certain IP address or of a particular application using a certain IP port type to be carried on the associated bearer.

From the received traffic characteristic classifiers 654 and traffic sorting rules 656, the mobile system 104 may request respective bearer resource modification for IP traffic exchanged on the home network 108 and the core mobile network 102. For example, the mobile system 104 may request to establish a dedicated bearer of a specific QCI 654 to do web surfing or FTP through the home network 108, and modify the existing bearer in the core mobile network 102 to continue voice and conversational video services.

Figure 7:
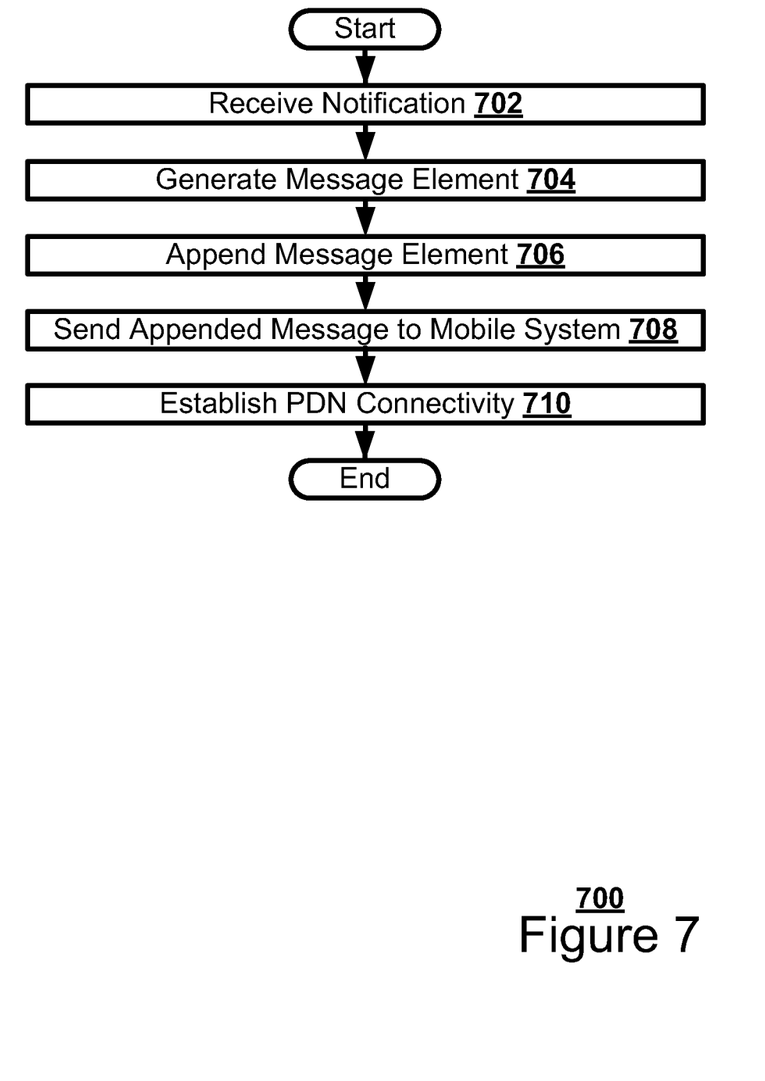
FIG. 7 illustrates, in a flowchart, one embodiment of a method for controlling access with a mobility management entity.

FIG. 7 illustrates, in a flowchart, one embodiment of a method 700 for controlling access with a MME 502. The MME 502 may receive a notification of a connection attempt by a mobile system 104 to connect to the home network base station 110 (Block 702). The MME 502 may generate a network access message element 650 having a bearer protocol parameter indicating a data bearer that the mobile system 104 may establish a packet data network with and the kind of specific data traffic that uses that packet data network (Block 704). The MME 502 may append the network access message element 650 to a message directed to the mobile system 104, such as an access status message 600 (Block 706). Alternately, the MME 502 may send the network access message element 650 to the home network base station 110, where the home network base station 110 may append the network access message element 650 to a message directed to the mobile system 104, such as an access status message 600. The MME 502 may send the appended message 600 to the mobile system 104 via the home network base station 108 (Block 708). The MME 502 may help the mobile system 104 to establish connectivity to the PDN between the mobile system 104 and the home network 108 via the home network base station 110 (Block 710). The mobile system 104 may then use the bearer protocol parameter to determine a traffic bearer for a data traffic set.

Figure 8:
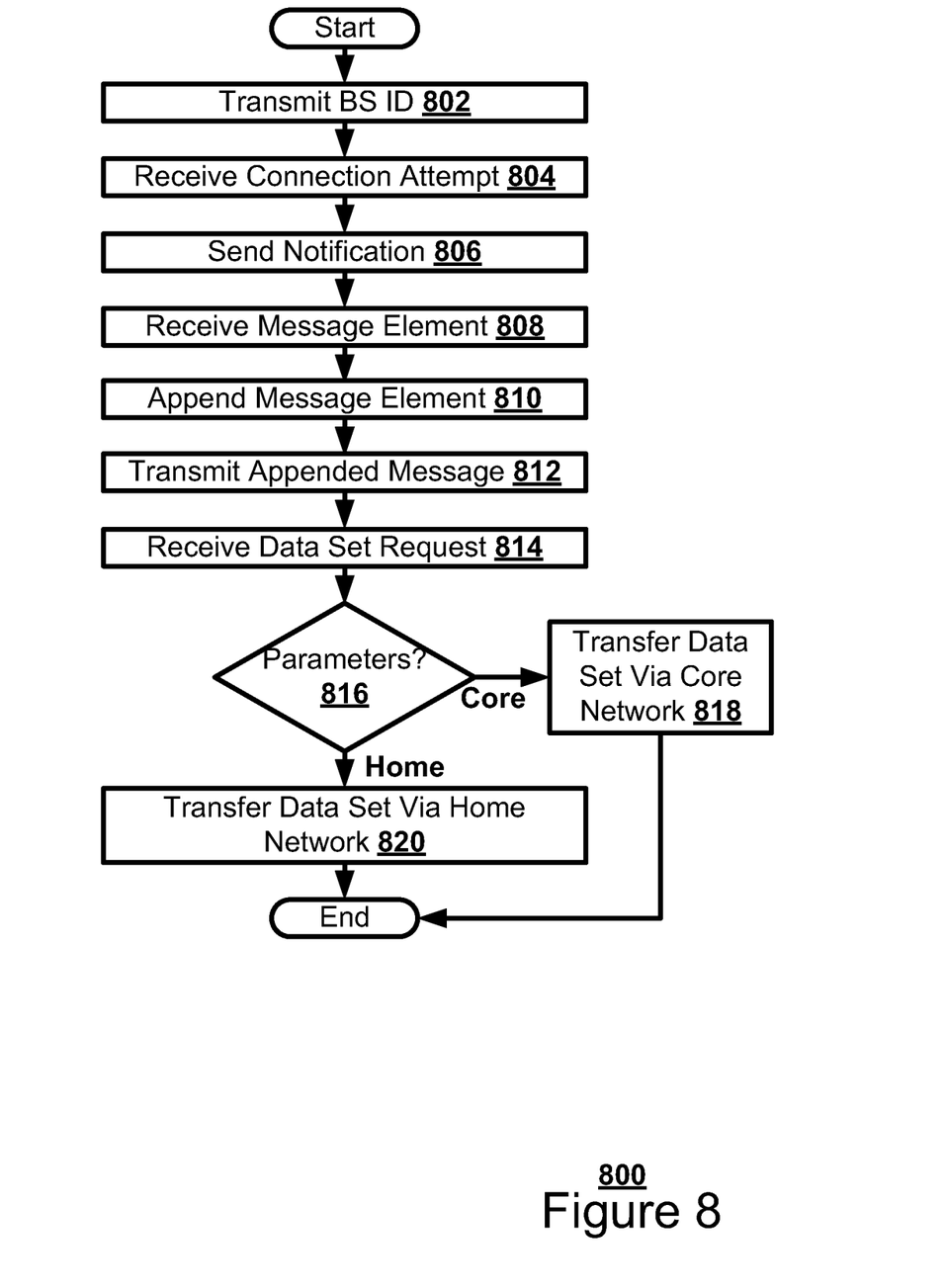
FIG. 8 illustrates, in a flowchart, one embodiment of a method for controlling access with a home network base station.

FIG. 8 illustrates, in a flowchart, one embodiment of a method 800 for controlling access with a home network base station 110. The home network base station 110 may transmit the BS ID 620 for reception by the mobile system 104 (Block 802). The home network base station 110 may receive a connection attempt from the mobile system 104 (Block 804). The home network base station 110 may send a notification of a connection attempt by the mobile system 104 to the MME 502 (Block 806). The home network base station 110 may receive via a network interface 260 a network access message element 650 from the MME 502 (Block 808). Alternately, the home network base station 110 or a MME 502 residing on the home network base station 110 may generate the network access message element 650. The home network base station 110 may append the network access message element 650 to a message 600 directed to the mobile system 104, such as an access status message 600 (Block 810). Alternately, the home network base station 110 may receive a message 600 with an appended network access message element 650 from the MME 502. The home network base station 110 may transmit the appended message 600 to the mobile system 104 (Block 812). The home network base station 110 may receive a data traffic request from the mobile system 104 (Block 816). The data traffic request may be associated with a traffic bearer based upon the bearer protocol parameters of the network access message element 650. If the data traffic matches the bearer protocol parameters of the core mobile network 102 (Block 818), the home network base station 110 may facilitate the mobile system 104 receiving data traffic via the core mobile network 102 (Block 820). If the data traffic matches the bearer protocol parameters of the home network 108 (Block 818), the home network base station 110 may facilitate the mobile system 104 receiving data traffic via the home network 108 (Block 822).

Figure 9:
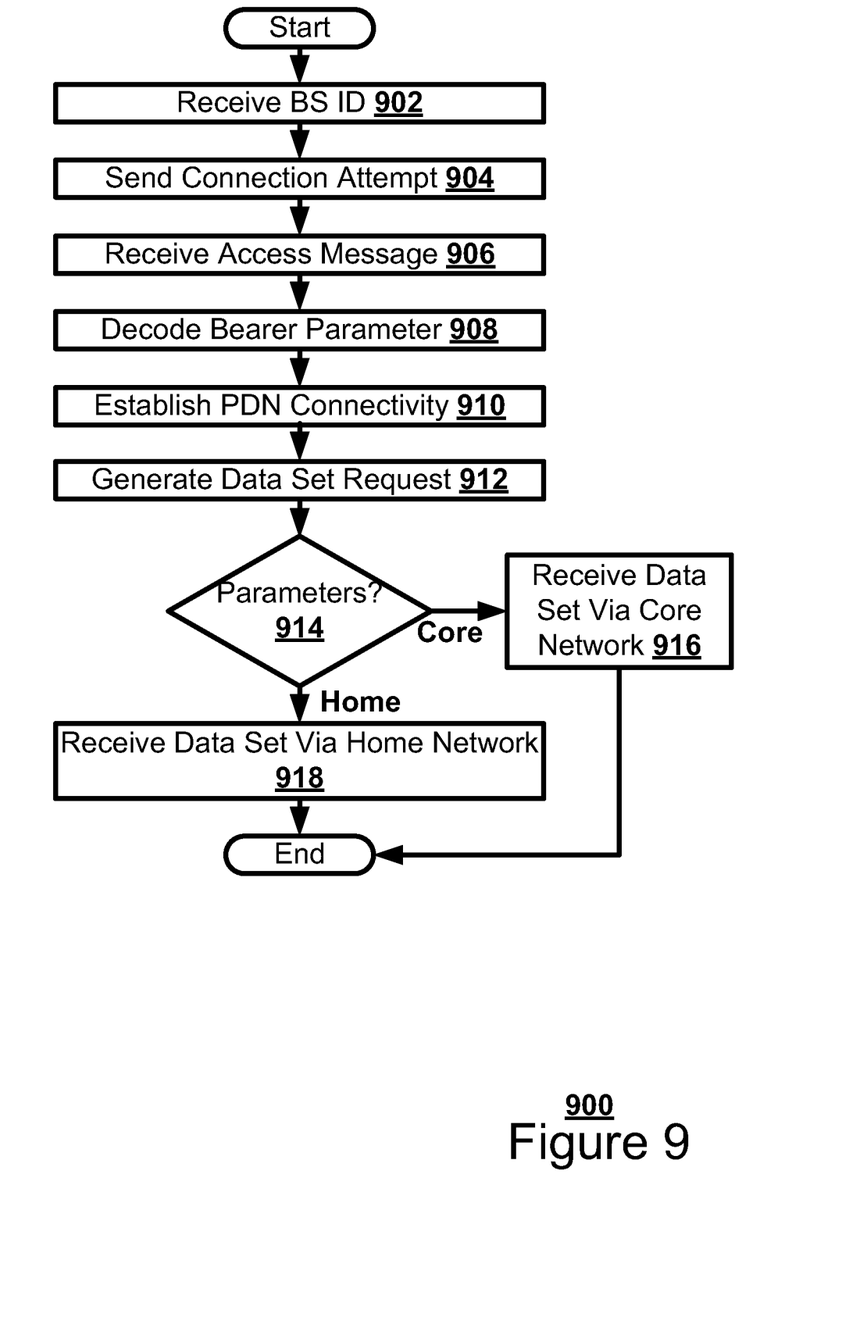
FIG. 9 illustrates, in a flowchart, one embodiment of a method for controlling access with a mobile system.

FIG. 9 illustrates, in a flowchart, one embodiment of a method 900 for controlling access with a mobile system 104. The mobile system 104 may receive the base station identifier from the home network base station 110 (Block 902). The mobile system 104 may send a connection attempt to the home network base station 110 (Block 904). The mobile system 104 may receive a message 600 containing a network access message element 650 from the home network base station 110 (Block 906). The mobile system 104 may decode the bearer protocol parameter from the network access message element 650 (Block 908). The mobile system 104 may establish PDN connectivity between the mobile system 104 and the home network 108 based on the bearer protocol parameter (Block 910). The mobile system 104 may generate a data traffic request (Block 912). The data traffic request may be associated with a traffic bearer based upon the bearer protocol parameters of the network access message element 650. If the data traffic matches the bearer protocol parameters of the core mobile network 102 (Block 914), the mobile system 104 may seek data traffic via the core mobile network 102 (Block 916). If the data traffic matches the bearer protocol parameters of the home network 108 (Block 914), the mobile system 104 may seek the data traffic via the home network 108 (Block 918).

Figure 10:
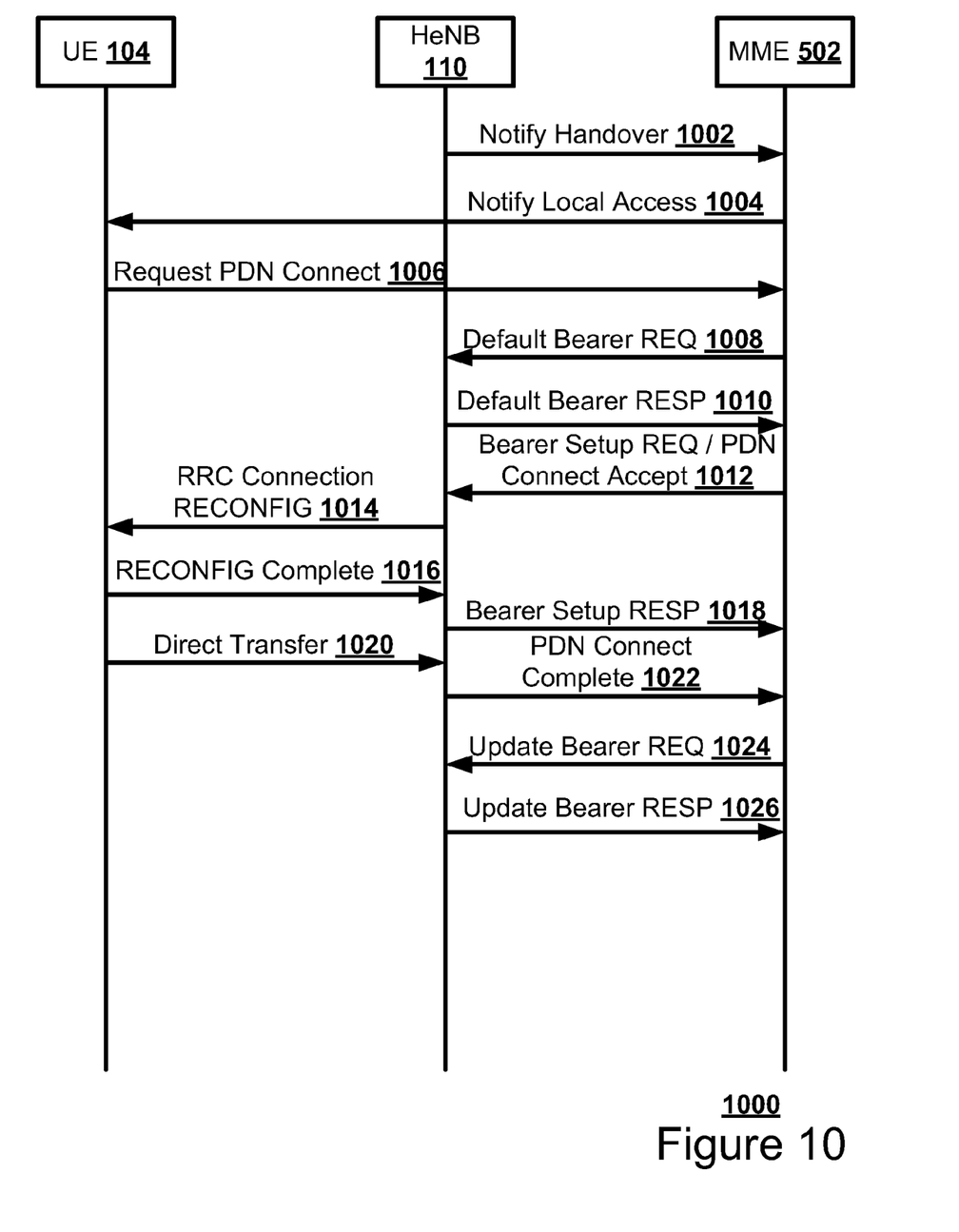
FIG. 10 illustrates, in a flow diagram, one embodiment of local internet protocol access establishment.

FIG. 10 illustrates, in a flow diagram, one embodiment of local internet protocol access establishment 1000. The home network base station 110 may notify 1002 the MME 502 of a mobile system 104 connecting to the home network base station 110. The MME 502 may send the mobile system 104 a message 1004, such as a local IP access notification 1004, containing the network access message element 650. The mobile system 104 may send the MME 502 a PDN connectvity request 1006, with bearer protocol parameters, such as a home network identifier 652, a traffic characteristic classifier 654, and a traffic sorting rule 656. The MME 502 may send the home network base station 110 a default bearer request 1008, with bearer protocol parameters, such as a traffic characteristic classifier 654 and a traffic sorting rule 656. The home network base station 110 may send the MME 502 a default bearer response 1010. The MME 502 may send the home network base station 110 a bearer setup request and PDN connectvity accept message 1012. The home network base station 110 may send the mobile system 104 a radio resource control (RRC) connection reconfiguration message 1014. The mobile system 104 may send the home network base station 110 a RRC connection reconfiguration complete message 1016. The home network base station 110 may send the MME 502 a bearer setup response 1018. The mobile system 104 may send the home network base station 110 a direct transfer message 1020. The home network base station 110 may send the MME 502 a PDN connectivity complete message 1022. The MME 502 may send the home network base station 110 an update bearer request 1024. The home network base station 110 may send the MME 502 an update bearer response 1026. The mobile system 104 may perform further data bearer modification requests and data traffic requests using the proper established bearers for the home network 108 and the core mobile network 102.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A method for controlling access with a mobility management entity, comprising:
   receiving a notification of a connection attempt by a mobile system to a home network base station;
   generating a network access message element having a bearer protocol parameter; and
   sending the network access message element to the mobile system via a home network base station for the mobile system to establish packet data network connectivity to a home network associated with the home network base station and to determine a traffic bearer for a data traffic set based on the bearer protocol parameter, wherein the traffic bearer is at least one of the home network using a local access protocol and a core mobile network using a core network access protocol; and
   when the data traffic set corresponds to the bearer protocol parameter for the core mobile network, the mobile system receives data traffic via the core mobile network, and when the data traffic set corresponds to the bearer protocol parameter for the home network, the mobile system receives data traffic via the home network.

2. The method of claim 1,
   wherein the home network base station provides access to the home network using the local access protocol and provides access to the core mobile network using a core network access protocol different from the local access protocol.

3. The method of claim 1, wherein the bearer protocol parameter is a home network identifier indicating availability of the home network, where the home network identifier is an Access Point Name.

4. The method of claim 1, wherein the bearer protocol parameter is a traffic characteristic classifier assigning a media type to a bearer option.

5. The method of claim 1, wherein the bearer protocol parameter is a traffic sorting rule assigning a media source to a bearer option.

6. The method of claim 1, wherein the home network provides access to peripheral devices connected to the home network and data stored on the home network.

7. A mobile system for accessing to a home network base station, comprising:
   a transceiver that receives from the home network base station a network access message element having a bearer protocol parameter for the mobile system to establish packet data network connectivity to a home network associated with the home network base station;
   a processor that generates a data traffic request associated with a traffic bearer based on the bearer protocol parameter;
   wherein the traffic bearer is at least one of the home network using a local access protocol and a core mobile network using a core network access protocol; and
   when a data traffic set corresponds to the bearer protocol parameter for the core mobile network, the mobile system receives data traffic via the core mobile network, and when the data traffic set corresponds to the bearer protocol parameter for the home network, the mobile system receives data traffic via the home network.

8. The mobile system of claim 7, wherein the network access message element originates from a mobility management entity.

9. The mobile system of claim 7,
   wherein the home network base station provides access to the core mobile network using a core network access protocol and provides access to the home network using the local access protocol different from the core network access protocol.

10. The mobile system of claim 7, wherein the network access message element is appended to an access status message.

11. The mobile system of claim 7, wherein the bearer protocol parameter is a home network identifier indicating availability of the home network, where the home network identifier is an Access Point Name.

12. The mobile system of claim 7, wherein the transceiver sends a packet data network connectivity request for the home network to the home network base station.

13. The mobile system of claim 7, wherein the bearer protocol parameter is a traffic characteristic classifier assigning a media type to a bearer option.

14. The mobile system of claim 7, wherein the bearer protocol parameter is a traffic sorting rule assigning a media source to a bearer option.

15. A home network base station that connects to a mobile system, comprising:
   a network interface that receives from a mobile management entity a network access message element having a bearer protocol parameter indicating a traffic bearer for a data set, wherein the traffic bearer is at least one of the home network using a local access protocol and a core mobile network using a core network access protocol;
   a transceiver that receives a connection attempt message from a mobile system and that sends the network access message element to the mobile system for the mobile system to establish packet data network connectivity to a home network associated with the home network base station, and when the data set corresponds to the bearer protocol parameter for the core mobile network, the mobile system receives data traffic via the core mobile network, and when the data traffic set corresponds to the bearer protocol parameter for the home network, the mobile system receives data traffic via the home network.

16. The home network base station of claim 15, further comprising:
   a processor that appends the network access message element to a message directed to the mobile system.

17. The home network base station of claim 15, wherein the bearer protocol parameter is a home network identifier indicating availability of the home network, where the home network identifier is an Access Point Name.

18. The home network base station of claim 15, wherein the transceiver receives a packet data network connectivity request for the home network from the mobile system.

19. The home network base station of claim 15, wherein the bearer protocol parameter is a traffic characteristic classifier assigning a media type to a bearer.

20. The home network base station of claim 15, wherein the bearer protocol parameter is a traffic sorting rule assigning a media source to a bearer.

* * * * *